Feb. 21, 1956     G. T. SCHJELDAHL     2,735,475
APPARATUS FOR WELDING LARGE SHEETS OF THERMOPLASTIC MATERIAL
Filed July 16, 1953     3 Sheets-Sheet 2
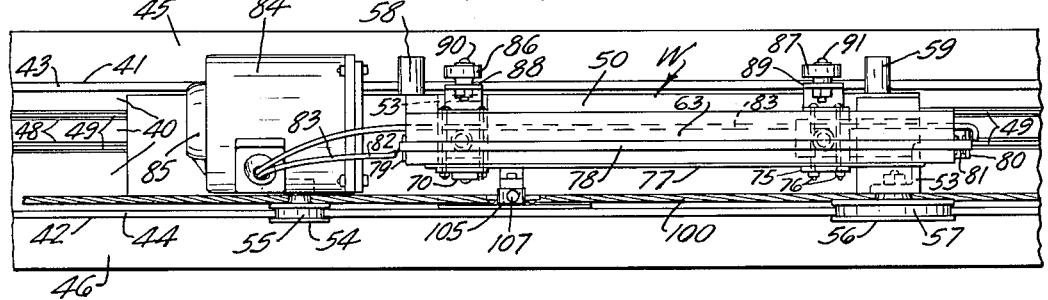
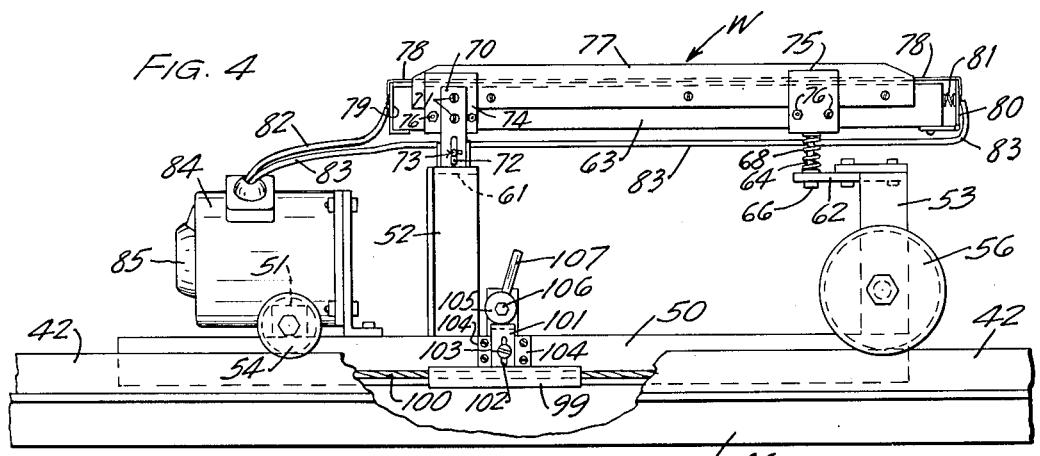
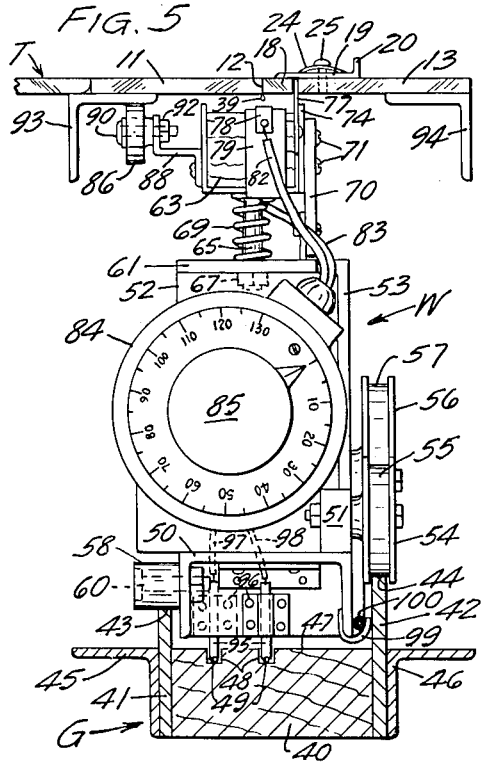
INVENTOR
GILMORE T. SCHJELDAHL
BY Williamson, Williamson, Schroeder & Adams
ATTORNEYS Feb. 21, 1956 G. T. SCHJELDAHL 2,735,475
APPARATUS FOR WELDING LARGE SHEETS OF THERMOPLASTIC MATERIAL
Filed July 16, 1953 3 Sheets-Sheet 3
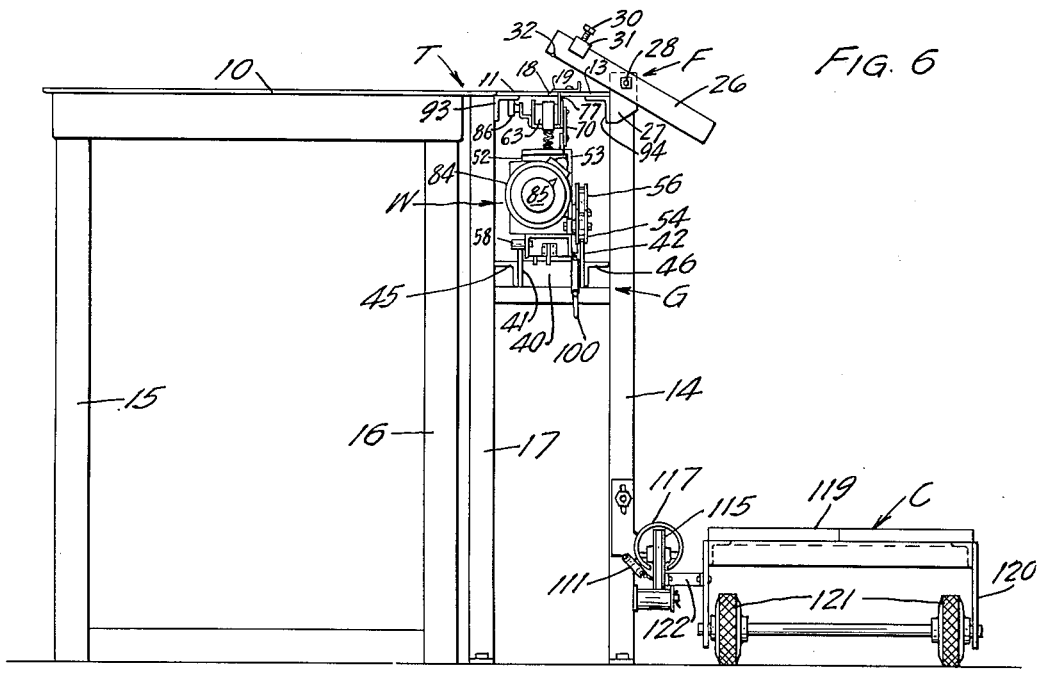
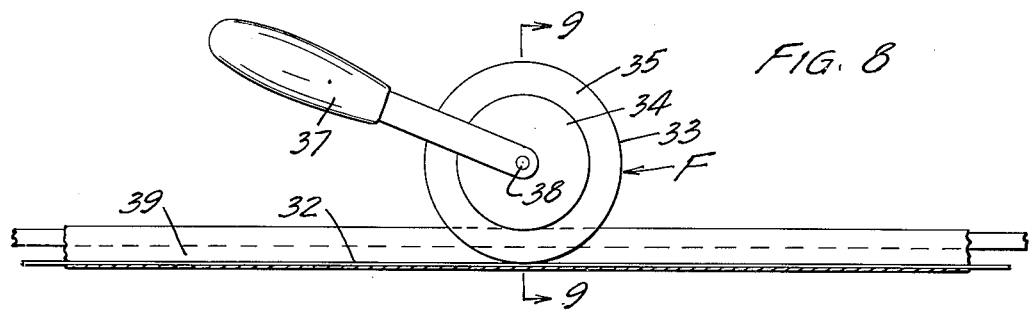
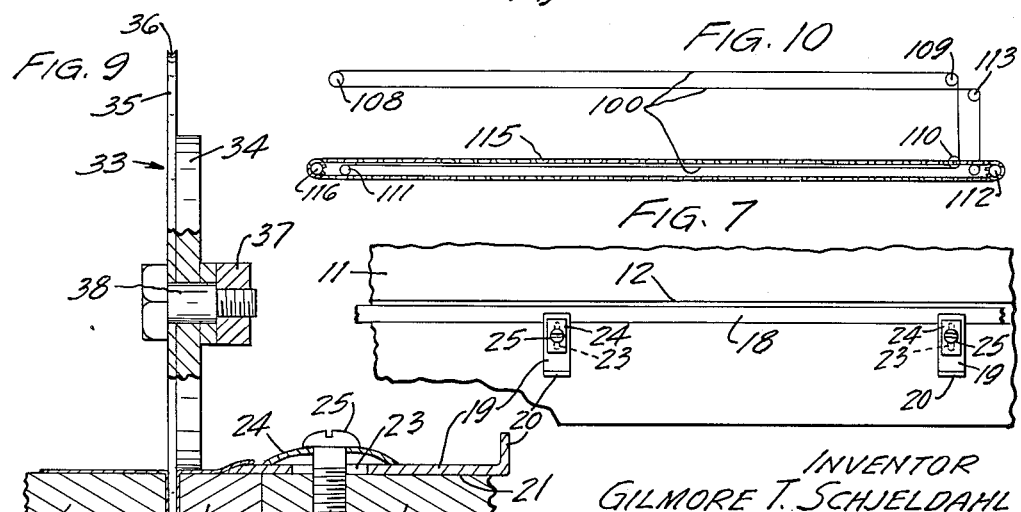
INVENTOR
GILMORE T. SCHJELDAHL
BY
Williamson, Williamson Schroeder & Adams
ATTORNEYS United States Patent Office 2,735,475
Patented Feb. 21, 1956

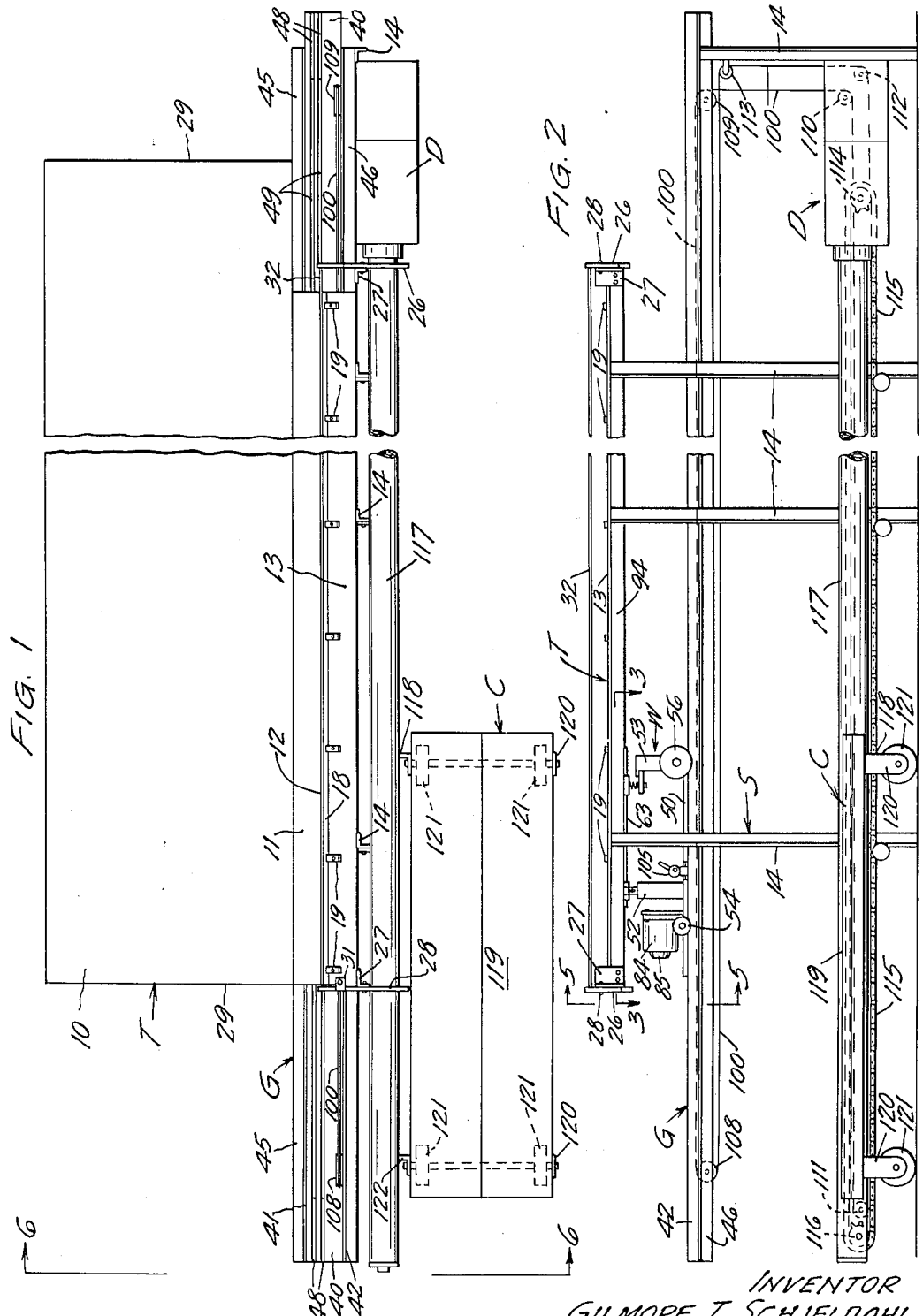

2,735,475

APPARATUS FOR WELDING LARGE SHEETS OF THERMOPLASTIC MATERIAL

Gilmore T. Schjeldahl, Farmington, Minn., assignor to Herb-Shelly-Inc., Farmington, Minn., a corporation of Minnesota Application July 16, 1953, Serial No. 368,350

8 Claims. (Cl. 154—42)

This invention relates to welding sheets and, more particularly, to apparatus and a method for effecting long, continuous heat seals between a plurality of thin and delicate thermoplastic sheets.

Reference is made to my co-pending application Serial No. 347,951, filed April 10, 1953, in which it was pointed out that, in the art of heat sealing, there are a number of conventional machines employing several general procedures.

One of these procedures involves pressing a heating element against one or both sides of layered thermoplastic sheets and heating at the point of pressure until the sheets fuse. This method is commonly used to make short seals such as for closures on plastic merchandise bags. Because the seal line is relatively short and the bag is an expendable item, provided with a temporary closure, the quality of the seal is not important.

Another type of seal which is commonly employed in thermoplastic sheets, is formed by feeding the sheets through opposed travelling belts with the heating element in close and fixed relation with the belt. This type of sealing device, and others as well, require a complex cooling system, the purpose of which is to actually chill the parts of the machine adjacent and in contact with the area to be heat sealed. The simultaneous application of heat and cooling to contiguous areas, presents an anomaly and introduces variable factors which make the sealing operation under such conditions highly critical. Here again, only relatively short seals are attempted. To the best of my knowledge, there has not been developed prior to my invention as disclosed in my co-pending application and the instant application, a successfully operating machine which is capable of making dependable and uniform heat seals across sheets of various thermoplastic material along a length exceeding more than a few inches. The problem of making uniformly strong seals of good appearance becomes more acute the thinner the stock of thermoplastic material. Thus, machines which may produce good seals on material above 1 mil in thickness often completely fail in sealing the same material of a thickness less than 1 mil, for example, a thickness of the order of ¼ mil.

A further problem is introduced if the plastic sheet material is oriented and/or tensilized during manufacture to increase the strength of the film. Orientation of the fiber or molecular structure causes the plastic sheet to become stronger in one direction than in another. An analogy may be drawn between woven cloth such as sheet material, and the oriented plastic film, although no visible fiber or lines can be seen in the flat plastic sheet. Now, if it is attempted to tear the woven sheeting, it will rupture lengthwise with the threads, and never diagonally. There is a similar tendency for oriented plastic sheets to tear in a preferred direction. In fabricating articles from oriented plastic sheets, the material is placed in such a direction that the greatest stress will coincide with the direction of greatest strength. In the case of tensilized films the "working" of the material during formation of the film will strengthen it materially without reference to the direction of fiber. Several examples of such plastic material which can be oriented or tensilized are various types of thermoplastic films such as "Mylar," (a condensation product of ethylene glycol and terephthalic acid), Pliofilm (rubber hydrochloride), polyethylene and polyvinylchloride. When the temperature of oriented and tensilized films is raised to a degree near the softening point, the film will become deoriented and weakened. Not only does the oriented film become weak where it is so heated, but it has a variable rate of shrinking and expansion. The oriented fiber will shrink more rapidly in one direction than another and ordinary heat seals of such plastic materials become puckered, wrinkled and even scalloped. Although the heat seal itself may be strong, the sheet plastic material immediately adjacent the seal will have become weakened to a point representing a small part of the ultimate strength of the material. The weakening phenomenon occurs both in the case of deoriented and detensilized films.

This invention contemplates as its general object, the provision of an apparatus and method for welding a long and continuous heat seal between unwieldy areas of overlapping sheets of thin and delicate thermoplastic material.

It is another object of the invention to provide an apparatus which will support layered thermoplastic sheets with a long off-set fold presented in precise fixed relation to a moving welding mechanism, the latter being operated in controlled spaced relation therewith.

It is a further object of the invention to provide a method of forming long, welded heat seals in thermoplastic sheets of the class described in which the seal will be strong and uninterrupted and the thermoplastic material surrounding the weld line will be smooth and uniform.

It is a still further object to provide for novel means for accurately tucking an off-set fold along a long length of overlapping sheet material prior to heat welding the sheets in a sealed line.

It is a still further object of the invention to provide means for inspecting both the tucking and welding operations so as to prevent waste of time and material.

These and other objects and advantages of my invention will more fully appear from the following description made in connection with the accompanying drawings wherein like reference characters refer to the same or similar parts throughout the several views and in which:

Fig. 1 is a top plan view of my heat welding apparatus, the medial portion thereof being cut away to shorten the view;

Fig. 2 is a side elevation of the apparatus viewed from the lower side as presented in Fig. 1;

Fig. 3 is an enlarged top view of the traveling weld mechanism from the line 3—3 and in the direction of the arrows as shown in Fig. 2, portions of the surrounding structure are cut away;

Fig. 4 is a side view of the traveling weld mechanism positioned upon its guideway, portions of the latter being cut away to better illustrate the cooperation of parts;

Fig. 5 is an end view of the traveling weld mechanism in position between the guideway and the table structure taken on the line 5—5 of Fig. 2;

Fig. 6 is an end elevation of my entire apparatus taken in the direction of the arrows 6—6 in Fig. 1;

Fig. 7 is a segmental enlarged detail of the clamping jaw structure of the supporting table;

Fig. 8 is an enlarged view illustrating the use of my sheet depressing and gauging means in effecting an offset fold in the sheet plastic material within the jaw structure, the table being shown segmentally;

Fig. 9 is a vertical sectional view of the sheet depressing and gauging means taken on the line 9—9 of Fig. 8; and Fig. 10 is a diagrammatic representation of the cable connection between the driving means and the traveling weld mechanism and inspection cart.

Referring now to the drawings and more particularly to Figs. 1 and 2, my device comprises an elongated supporting structure S which may be of indefinite length, lengths up to 120 feet being successfully employed in the heat welding of plastic balloon sections. The supporting structure S has secured at its upper portion a sheet supporting and clamping table T. This table constitutes the working surface of the apparatus upon which overlapped sheets of long and thin plastic material are carefully laid prior to the welding operation. The table structure T in turn comprises a flat table top 10 which extends longitudinally for an uninterrupted length as shown.

The clamping structure in the table is formed by a steel plate 11 having its upper surface flush with the surface of table 10 and extending along one edge thereof as shown in Fig. 1. The outer edge 12 of the plate 11 constitutes a fixed jaw which is straightly aligned for the entire length of table 10. A continuation of the table surface 10 is formed by the outer strip 13 which likewise has its upper surface in the same plane with the table top 10 and the fixed jaw 11. The outer strip 13 is fastened to upright members 14 which constitute a portion of the elongated supporting structure S. The table 10 is supported by a row of outer legs 15, a row of inner legs 16 and a series of upstanding legs 17 which connect with and underlie the fixed jaw portion 11 as shown in Fig. 6. The outer strip 13 lies in spaced parallel relation with the fixed jaw 11 and has slidably therealong a movable jaw 18. The movable jaw 18 has bracket members 19 secured to the upper surface thereof, the said bracket members 19 being arranged in spaced relation along the entire length of the movable jaw 18. Each of the brackets 19 has an upstanding end portion 20 for manual gripping and the under surface 21 lies in the same plane as the table top 10 and fixed jaw 11. The brackets 19 are adapted to slide laterally over the surface of the outer table strip 13 and are guided in their sliding movement by bolts 22 secured to the strip 13 and cooperating with slotted openings 23 formed medially of each of the brackets 19. The bolts 22 have spring washer members 24 positioned between the head 25 and the upper surface of bracket 19 so as to maintain the bracket frictionally in its adjusted position. The movable jaw 18 when in open position has its outer edge against the inner edge of the table strip 13 as shown in Figs. 1 and 9. When thus in open position, an elongated crack or crevice is created for the entire length of the supporting table T and will be utilized for clamping an offset fold in long sheets of overlapping thermoplastic material as will be subsequently described.

Referring now to Figs. 1, 2 and 6, I employ folding and tucking means F for forming the offset fold of plastic sheet material between the movable and fixed jaws 18 and 11 while they are in open or spaced relation. The particular mechanism which I employ to achieve my purpose constitutes a pair of pivoted arm members 26 disposed one at each end of the sheet supporting and clamping table T as shown. An L-shaped bracket 27 is attached to opposed corners of the table as shown in Fig. 1 and a bolt 28 passes through a medial opening in the arm 26 so that the arms 26 may be independently pivoted thereabout in close clearance with the end edges 29 of the table T. A stop screw 30, however, is secured to the arm 26 by means of the L-shaped bracket 31 so as to limit the downward travel of the inner end of each arm 26. The stop screw 30 may be adjusted so that the arm 26 will pass by the upper surface defined by the fixed and movable jaws 11 and 18 for a precise distance depending on the depth or degree of offset required during the tucking and folding operation. A wire 32 is tensioned across the inner ends of the arms 26 as shown in Figs. 1, 2 and 6. The taut wire is so positioned that it will precisely enter the crevice created by the relationship of the jaws 11 and 18 when open as shown in Figs. 1 and 9. Since this invention contemplates only the welding of unwieldy and elongated sheets of thermoplastic material, the taut wire 32 will necessarily have a slight amount of yielding, especially in the intermediate portions of the apparatus. Even though very thin and delicate plastic sheets are being tucked and folded by the taut wire, it will not be possible to secure a complete and precise measurement of the offset required. For this reason, a second portion of my folding and tucking means comprises a depressing and gauging means 33 which is preferably in the form of a thin wheel having an annular shoulder 34 as shown in Figs. 8 and 9. The outer annular extension 35 has a grooved periphery 36 as shown in Fig. 9. A mounting structure such as the manual handle 37 is pivotally and rotatably journaled at 38 to the axis of the sheet depressing and gauging wheel 33. The difference between the radius of the annular shoulder portion 34 and the grooved wheel periphery 35 constitutes the depth to which the periphery will extend when the wheel is rolled along the surface of either jaw member 11 or 18. The grooved periphery 36 is adapted to ride upon the taut wire 32 as shown in part in Figs. 8 and 9 with the annular shoulder 34 precisely gauging the amount to which the wire, together with the offset fold 39 of layered plastic sheets, will be depressed. The appearance of the gauging wheel 33 when in contact with the taut wire 32 and the offset fold 39 is as shown in Fig. 9.

A track or guideway G is mounted upon the brace or supporting structure S between the upright legs 14 and 17 for the entire length of the apparatus and preferably extending somewhat beyond the end edges of the table structure T. The track or guideway G underlies the jaws 11 and 18 in spaced parallel relation with the edges thereof as shown in Fig. 2. The track or guideway G has a medial body portion 40 to which upstanding side members 41 and 42 are secured as shown in Fig. 5. The upper edge 43 of side member 41 constitutes one track and the upper edge 44 of member 42 constitutes another track. Angle irons 45 and 46 are secured at the outer surfaces of the members 41 and 42 as shown in Fig. 5 and constitute connecting pieces for rigid attachment to the upright legs 14 and 17 of supporting structure S. In the upper surface 47 of the body 40 are a pair of longitudinal grooves 48 each of which contains an electrical conductor such as an elongated copper wire 49. The copper wires 49 have maintained thereacross an electrical potential such as may be achieved by connection to an ordinary source of electrical power (not shown).

Upon the track or guideway G and in contact with the under surface of table T is a traveling weld mechanism W as shown in Figs. 2, 3, 4 and 5. The traveling weld mechanism W has a supporting framework 50 to which upright brackets 51, 52 and 53 are secured as shown in Fig. 4. The bracket 51 has a wheel 54 secured thereon for free rotation with its grooved periphery 55 in contact with the upper track edge 44 of the side member 42. In a forward position another grooved wheel 56 is rotatably mounted upon the bracket 53 with its grooved periphery 57 likewise riding upon the upper track edge 44 as shown in Figs. 4 and 5. At the opposite side of the frame 50 a pair of smaller wheels 58 and 59 are respectively journaled for free rotation upon a stub shaft 60, one of which is secured to the frame 50 at either end of the traveling weld mechanism W as shown in Fig. 3. These wheels 58 and 59 are positioned so as to ride in rolling contact with the upper track edge 43.

At the upper portion of rigid bracket 52 is a laterally extending arm 61 and at the upper portion of the corresponding bracket member 53 is a laterally extending member 62 as shown in Figs. 4 and 5. A dielectric mounting block 63 is positioned over the lateral members 61 and 62, a pin or bolt 64 extending downwardly through an opening in the bracket 62 and a similar rigid bolt 65 extending from the block 63 downwardly through an opening in the lateral member 61. Each of the pins 64 and 65 have respective abutments 66 and 67 which limit the upward movement of the block 63 under compression of the spring members 68 and 69, which are respectively interposed between the block 63 and the bracing members 52 and 53 and preferably are mounted upon the pins 64 and 65. In order to maintain lateral stability, a downwardly extending flange 70 is secured to the block 63 by such means as bolts 71 and a vertical slot 72 in the flange 70 slidably cooperates with a bolt 73 as shown in Fig. 4. A pair of plates 74 and 75 respectively are clamped to the block 63 by such means as bolts 76 for the purpose of holding a guide blade 77 in upstanding alignment for cooperation with the rear opening formed when movable jaw 18 is closed against the fixed jaw 11. Medially of the top of block 63 and disposed longitudinally therealong is a heating element such as the high resistance heating element or ribbon 78. The heating element 78 is fastened at one end of dielectric block 63 to a conducting bracket 79 as shown in Fig. 5 and at the other end to another conducting bracket 80 which is disposed at the other end of block 63 as shown in Fig. 4. One of the brackets, for example bracket 80, may be resiliently mounted upon the insulating block 63 so as to tension the ribbon or heating element 78. A small compression spring 81 may be employed for this purpose, the spring being interposed between the end of block 63 and the bracket member 80 upon which the ribbon 78 is secured. Conducting leads 82 and 83 connect respectively with the conducting bracket 79 and 80, thus completing an electrical circuit through the heating element or ribbon 78. The conductors 82 and 83 are connected to terminals in a rheostat device 84 which is in turn mounted upon the supporting frame 50 as shown in Figs. 4 and 5. The resistance element or rheostat 84 may have a dial arrangement 85 so that the proper degree of heat may be adjustably attained from the heating element 78.

Because lengths of apparatus in the order of 100 feet or so are very difficult to maintain in absolute alignment I have provided separate means for assuring the proper spaces between the heating elements 78 and the folded edge of the plastic sheets at their clamped offset. Even where apparatus having a length of such magnitude is machined to close tolerance, weather conditions, vibration and so forth will cause a fluctuation in measurements sufficient to cause trouble if they are not otherwise compensated for. Furthermore, it is difficult to obtain a floor or base which is sufficiently rigid and true to maintain a long apparatus in perfect adjustment even though machined to close tolerance. I have found that a simple solution to the problem of tolerance on a large scale apparatus of the class described can be accomplished first by gauging the depth of the fold in the plastic sheets regardless of any minor undulations in the length of the table top and furthermore provided for close control over the spacing of the travel welding mechanism W with respect to the offset fold of the plastic sheets which will also respond to any slight lateral curvature or vertical undulations in the table top T. The first of the means for maintaining alignment of the welding mechanism has already been mentioned, namely the thin guide blade 77 which is adapted to slide in the opening formed when the movable jaw 18 is pushed forward in clamping position. This arrangement is shown in Fig. 5. The guide blade 77 maintains the ribbon 78 in lateral alignment with the fold 39 of the plastic sheets. Further means must be provided, however, so as to maintain precise control over the vertical clearance between the ribbon 78 and the bottom edge of fold 39. For this purpose I employ trolley wheels 86 and 87 as shown in Figs. 3 and 5. These trolley wheels are mounted respectively on mounting brackets 88 and 89 as shown. The trolley wheels are rotatably secured to stubs shafts 90 and 91 which, in turn, are bolted to the brackets 88 and 89 as at 92 respectively. The trolley wheels 86 and 87 are adapted to engage the underside of table T and, in particular, a longitudinal angle iron 93 which forms a part of the bracing structure rigidly connected with the table T and forming a part of the supporting structure S. Another angle iron 94 is secured across the upright legs 14 and lies in spaced parallel relation with the angle iron 93 which is secured to upright supporting members or legs 17. When the traveling welding mechanism is positioned on its tracks as shown in Fig. 5, an electrical circuit is established from the copper wires 49 through a pair of brushes 95 which are in turn mounted in insulated relation by brackets 96 to the underside of frame 50. The resistor or rheostat 84 has a pair of incoming leads 97 and 98 each of which is attached to a contact brush 95.

A cable clamping device comprises a rigid cradle 99 secured to the base 50 of the traveling weld mechanism W. The cradle 99 has an outwardly extending portion which is adapted to hold a cable 100 in guided relation therewithin. The cable 100 may be permitted to move within the cradle 99 without causing travel of the weld mechanism. However, when it is desired to cause the weld mechanism to move forwardly with the cable 100, the clamping device is brought into play. The clamping device comprises a vertical bar 101 having a slot 102 disposed therein which in turn slidably engages a pin 103 which is secured to frame 50. Bar 101 is held in vertical position by guide brackets 104 which are also secured to base 50. A cam latch 105 is pivotally mounted at 106 to the bracket 104 and has a handle 107 extending outwardly therefrom for manual reciprocal motion. When the cam latch 105 is in the position shown in Fig. 4, the bar 101 will be relaxed and allow the cable 100 to slide through its cradle 99. If, however, the handle 107 is moved counterclockwise as viewed in Fig. 4, the bar 101 will be depressed and will bind the cable 100 between the bar 101 and the cradle 99 so as to cause the entire traveling weld mechanism to move together with the cable 100.

Referring now to Figs. 1, 2 and 10, the cable 100 is shown as mounted on pulleys 108 at one end of the apparatus and on pulley 109 at the other end. These pulleys 108 and 109 are respectively journaled for free rotation in the track or guideway 40 as shown in Fig. 6. After passing over the pulleys 108 and 109, the cable 100 proceeds downwardly and passes reversely over the pulley 110 secured to the supporting structure from which it travels the length of the apparatus to another pulley 111 rotatably mounted at the other end of the apparatus. The cable then again reverses itself and passes over pulley 112 secured to the opposite end of the apparatus from which it travels upwardly then reversely passes over pulley 113 and travels back over pulley 108 to the beginning.

Drive means D is mounted at the same end of the apparatus as that which rotatably supports the pulleys 109, 110, 112 and 113. The drive means D has an internal mechanism for slowly and steadily driving a sprocket 114 as shown in Fig. 2. The sprocket 114 in turn drives a long roller chain 115 over a sprocket idler 116 rotatably mounted to a portion of the supporting structure S at the end opposite the drive means D. A slotted tube 117 may be employed to house a portion of the traveling cable and roller chain. Cable 100 is joined to the roller chain 115 as at 118 in Figs. 1 and 2. It is understood, of course, that the drive means D is reversible and that the weld mechanism W can be caused to travel the full length of the apparatus in either direction.

Also secured to the mutually traveling roller chain 115 and cable 100 is an inspection cart C which is adapted to travel over the floor to one side of the apparatus as shown in Figs. 1 and 2. The inspection cart C has a supporting platform 119 which in turn is equipped with four trucks 120, each having rotatably mounted thereon a supporting wheel 121. The cart is secured to the roller chain 115 at its forward position by link 118 and at a rearward position by another connecting link 122. The inspection cart is so positioned that an operator can ride therealong in a position to inspect the quality and tolerances of the plastic fold and also to travel therealong to observe the quality of the heat seal formed. It will be noted that the cart may be caused to immediately follow the traveling weld mechanism W so as to discover any flaws in the seal line of the welded fold.

*Operation*

In the use and operation of my apparatus, I place upon the long table surface 10 of the table structure T a pair of overlapping plastic sheets which may be constructed of such material as Mylar, previously noted, having a thickness of as little as a quarter mil. These sheets can be safely handled even in lengths as great as 120 feet in my apparatus. Concurrent edges of the overlapped sheets are then placed over the clamping jaws 11 and 18, the movable jaw 18 having been first retracted to its open position as shown in Figs. 1 and 9. When the overlapping sheets of thermoplastic material have been properly positioned, an operator at each end of the apparatus grasps the arm 26 at its outer end and causes the arm to rotate about pivot 28, thereby bringing the taut wire 32 into the crevice between the jaws 11 and 18 and consequently depressing an offset fold 39 into the crevice throughout the length thereof. This initial depressing of the offset fold 39 is clearly shown in Fig. 9. As previously pointed out, however, the taut wire will not be completely rigid and therefore the central areas of the table will not have the offset fold depressed to the same degree as will be through near the outer ends. Thus, after the taut wire 32 has been passed through the crevice between the jaw and the stop members 30 have engaged the upper surface 10 of the table, the second depressing step is then accomplished by engaging the groove 36 of the depressing and gauging wheel 33 with the upper edge of taut wire 32 as it lies in contact with the offset fold of overlapped thermoplastic sheet material. In this position, the annular shoulder 34 will engage the upper plane surface of either jaw 18 or 11 (the plane being the same in each case) and the wheel is then rolled from one end of the apparatus to the other, all the while maintaining the shoulder in rolling contact with the sheet material and jaw. The effect of rolling the wheel 33 will be to locally depress the wire 32 and to maintain the gauged distance at the rear of the forwardly moving wheel. After the depressing and gauging wheel has finished its work, the brackets 19 are pushed inwardly so as to clamp the offset fold 39 between jaws 11 and 18. Since the movable jaw 18 is flexible in lengths of the order of the apparatus described, the individual spaced brackets are preferably pushed shut progressively from one end to the other. I prefer to do this clamping operation by manual means because the thermoplastic sheets with which I am operating are so delicate that dust or grit particles can puncture the sheets if they are pressed too firmly thereagainst as by mechanical clamping means. The frictional washer 24 will retain each of the brackets 19 and its portion of the movable jaw 18 in mild clamping engagement with the offset fold 39 thereby maintaining the fold in readiness for heat welding or sealing. It will be noted that any undulations or slight sinuous variation in the true alignment of the crevice formed between the jaws will be compensated for by the depressing and gauging wheel 33 as it traveled along the crevice. As will be noted from Fig. 9, the outer flange 35 of the wheel 33 rides fairly snugly within the crevice but without bearing unduly against the inner sides of the offset fold. The local contact is between the wheel and the taut wire 32, not directly with the plastic material itself. The result is a gentle pressure distributed over a local length of material rather than being concentrated entirely at one spot at any one given time.

The operators depress the outer ends of the arms 26 so as to withdraw the taut wire 32 from the crevice, leaving the offset fold 39 in its gauged condition. Then, as previously noted, the movable jaw 18 is pressed gently against the offset fold to hold it in its gauged relation with the table top T.

The cable clamping device on the traveling welding mechanism is moved to disengagement as in Fig. 4. In this position, the cable 100 will travel through the cradle 99 without causing the mechanism W to travel along with it. The drive means D is then energized so as to cause the cable 100 to travel to the right as viewed in Fig. 4. The corresponding portion of the cable 100 as viewed in the diagrammatic representation of Fig. 10 is the uppermost strand overlying the pulleys 108 and 109. When thus energized, the inspection cart C will be caused to travel from left to right as shown in Fig. 2. An operator may sit on the inspection cart and view the quality of the offset fold in its clamped relation as the cart slowly travels from one end to the other. It is within the contemplation of my invention to mount mechanical devices such as feeling fingers or electric eye mechanism which will be capable of detecting flaws in the fold such as gaps between the overlapping layers of material or such other imperfections as wrinkles or perforations. If the tucking operation passes inspection, then the drive means D is reversed causing the cart C to travel back to its original position as shown in Fig. 2. The drive means is again reversed, the heating element 78 energized and controlled to the desired degree of heat by rheostat 85, and the clamping cam device actuated so as to grip the traveling weld mechanism to the cable 100. The traveling weld mechanism will then travel forwardly in close clearance with the lowermost edge of the offset fold and will fuse the thin thermoplastic material together. Again, the inspector can sit on the inspection cart C and follow closely behind the traveling weld mechanism so as to observe the quality of the finished weld. The heating element or ribbon 78 maintains its proper spaced relation with respect to the offset fold because of the guided travel regardless of inaccuracies in the alignment of the jaws 11 and 18. As previously noted, the trolley wheels 86 and 87 will maintain the block 63 together with the heating element 78 in proper spaced relation and, if any warpage or undulation occur in the length of the table, the trolley wheels will merely compensate for such variation. Similarly, the guide blade 77 will maintain the heating element 78 in proper lateral position so as to exactly underlie the folded edge 39 of the thermoplastic offset. When the weld has been completed, the panels are separated and a new panel may be similarly welded to the opposite edge of the preceding one, thus building huge areas of extremely thin thermoplastic material with a degree of reliability heretofore unattained.

It will, of course, be understood that various changes may be made in the form, details, arrangement and proportions of the parts without departing from the scope of my invention.

What I claim is:

1. A machine for welding large sheets of thermoplastic material in a long continuous seal comprising, a sheet supporting and clamping table for maintaining a longitudinally off-set fold along the length of said sheets, a guideway secured in spaced parallel relation with said table and with an off-set fold of overlapping plastic sheets when positioned within the clamping portion thereof, and a traveling weld mechanism mounted for longitudinal movement along said guideway, said travelling weld mechanism having a heating element for welding said off-set fold during steady and even travel thereof along the guideway and in close clearance with said off-set fold.

2. A machine for welding large sheets of thin thermoplastic material in a long continuous seal comprising, a sheet supporting and clamping table for maintaining longitudinally along its length an off-set fold of overlapping sheets, said off-set fold presenting a straightly aligned looped edge, a guideway secured in spaced parallel relation with said table and underlying said off-set fold of overlapping plastic sheets when positioned within the clamping portion of said table, travelling weld mechanism mounted for longitudinal movement along said guideway, said travelling weld mechanism having a heating element for welding said looped edge by heat during steady and even travel thereof along the guideway and in close clearance with said off-set fold, and means interposed between said welding mechanism and said table for maintaining precise measurement of said close clearance in the presence of undulations along the length of said sheet supporting and clamping table.

3. The subject matter of claim 1, and driving means for moving said traveling weld mechanism along the guideway.

4. A machine for welding large sheets of thin thermoplastic material in a long continuous seal comprising, an elongated table, cooperating jaws defining a straightly aligned separable and closable crevice for maintaining along its length an offset fold of overlapping sheets, a guideway secured underneath said table and underlying in spaced parallel relation said cooperating jaws, and a traveling weld mechanism mounted for longitudinal movement along said guideway, said traveling weld mechanism having a heating element for welding said offset fold by heat during steady and even travel thereof along the guideway and in close clearance with said offset fold.

5. Apparatus for welding along a length of overlapped thin thermoplastic sheets in a long continuous seal comprising, an elongated sheet supporting and clamping table having separable longitudinal jaws in the surface thereof, tucking means movable inwardly for entering said jaws while separated and for pressing an offset fold of the overlapping sheet material through said jaws, and sheet depressing and gauging means for pressing upon said tucking means and thereby precisely gauging the amount of offset desired, and heat welding mechanism movable to close clearance with said offset fold.

6. Apparatus for welding along a length of overlapped thin thermoplastic sheets in a long continuous seal comprising, an elongated sheet supporting and clamping table having separable longitudinal jaws in the surface thereof, tucking means reciprocable inwardly for pressing an off-set fold of said overlapping sheets into said jaws while separated for subsequent clamping engagement therewithin, sheet depressing and gauging means for further pressing said tucking means and precisely gauging the amount of off-set desired, and heat welding mechanism mounted for longitudinal travel in close clearance with said off-set fold.

7. Apparatus for welding along a length of overlapped thin thermoplastic sheets in a long continuous seal comprising, an elongated sheet supporting and clamping table having separable longitudinal jaws in the surface thereof, an elongated wire member tensioned with respect to said table and movable inwardly for entering said jaws while separated to press an off-set fold of the entire length of said overlapping sheet material through said jaws, sheet depressing and gauging means for further pressing said wire member together with said sheets for precisely gauging the amount of off-set desired, and heat welding mechanism movable to close clearance with said off-set fold.

8. Apparatus for welding along a length of overlapped thin thermoplastic sheets in a long continuous seal comprising, an elongated sheet supporting and clamping table having separable longitudinal jaws in the surface thereof, a wire member tensioned for the length of said jaws and movable inwardly therebetween for pressing an off-set fold of the entire length of said overlapping sheet material through said jaws, a wheel having a grooved periphery and an annular flange for contacting said table, the grooved periphery thereof being engageable with said wire member for further pressing said off-set fold through said jaws to a precisely gauged depth, and heat welding mechanism movable to close clearance with said off-set fold.

References Cited in the file of this patent
UNITED STATES PATENTS

| | | |
|---|---|---|
| 2,343,975 | Hosfield | Mar. 14, 1944 |
| 2,524,584 | Zehr | Oct. 3, 1950 |
| 2,535,029 | Atanasoff et al. | Dec. 26, 1950 |
| 2,647,072 | Smith | July 28, 1953 |